3,681,328
SYDNONE DERIVATIVES OF 7-AMINO-
CEPHALOSPORANIC ACIDS
Masaru Kurita, Tondacho, Yoshihisa Saito, Suita, and
Tsutomu Teraji, Nishikinya, Japan, assignors to Fuji-
sawa Pharmaceutical Co., Ltd., Osaka, Japan
No Drawing. Filed June 27, 1967, Ser. No. 649,113
Int. Cl. C07d 99/24
U.S. Cl. 260—243 C                                    7 Claims

ABSTRACT OF THE DISCLOSURE

The disclosure teaches novel 3- and/or 4-substituted sydnone derivatives of 7 - aminocephalosporanic acids which are useful as an antibacterial agent in the treatment of the infectious diseases by Gram-negative and Gram-positive organisms.

---

This invention relates to novel compounds and to methods for preparing the same. More particularly, this invention relates to novel sydnone derivatives of 7-aminocephalosporanic acids and to methods for preparing the same.

It is an object of this invention to provide novel sydnone derivatives of 7-aminocephalosporanic acids which possess highly antibacterial properties against Gram-negative and Gram-positive organisms. It is a further object of this invention to provide methods for preparing sydnone derivatives of 7-aminocephalosporanic acids. Other objects and advantageous features will become clear in the light of the accompanying disclosure.

Object compounds of this invention are as follows:

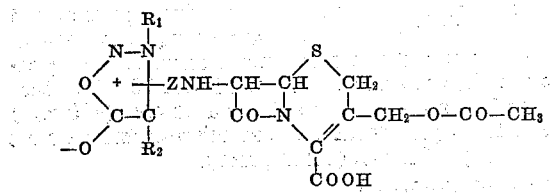

in which $R_1$ is lower alkyl, aryl or aryl-lower alkyl;
$R_2$ is hydrogen, halogen, lower alkyl, aryl or aryl-lower alkyl; and
Z is carbonyl, lower alkylenecarbonyl, aryl-lower alkylenecarbonyl or arylene-lower alkylenecarbonyl when $R_2$ is replaced by Z, or Z is lower alkylenecarbonyl, aryl-lower alkylenecarbonyl or arylene-lower alkylenecarbonyl when $R_1$ is replaced by Z, and pharmaceutically acceptable non-toxic salts thereof.

The halogen atom heretofore referred to includes chlorine, bromine and the like.

The lower alkyl group heretofore referred to includes lower aliphatic radical containing 1 to 4 carbon atoms of both straight-chain and branched-chain which may be substituted by halogen, hydroxy, amino, carboxyl, lower alkoxy having 1 to 4 carbon atoms and lower alkanoyloxy having 1 to 4 carbon atoms. Examples of the lower alkyl group are methyl, ethyl, propyl, isopropyl, butyl, isobutyl, chloromethyl, chloroethyl, bromomethyl, hydroxymethyl, hydroxyethyl, aminoethyl carboxyethyl, methoxyethyl, ethoxyethyl, acetoxymethyl and the like.

The lower alkylene group heretofore referred to includes a saturated divalent aliphatic radical of both straight-chain and branched-chain, such as methylene, ethylene, propylene, butylene or methylmethylene.

The arylene-lower alkylene group heretofore referred to includes the divalent radical such as phenylenemethylene

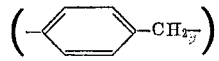

or phenyleneethylene

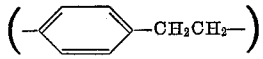

The aryl group referred to as aryl, aryl-lower alkyl and aryl-lower alkylenecarbonyl may be subsituted by halogen, hydroxy, nitro or lower alkoxy. Examples of the aryl group are phenyl, naphthyl, o-, m- or p-chlorophenyl, o-, m- or p-bromophenyl, o-, m- or p-nitrophenyl, p-hydroxyphenyl, p-methoxyphenyl, p-ethoxyphenyl, 4 - nitro-1-naphthyl, 4 - hydroxy-1-naphthyl and the like.

The object compounds can be prepared by acylation of 7-aminocephalosporanic acid of the formula:

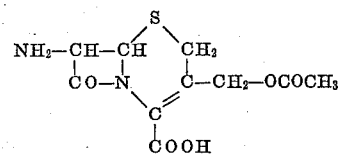

with sydnone compounds of the formula:

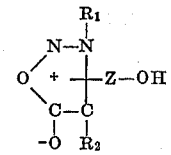

or reactive derivatives thereof to obtain the corresponding 7-substituted derivatives of the formula:

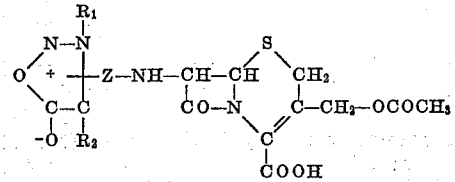

in which $R_1$, $R_2$ and Z have the significance as defined above.

7-aminocephalosporanic acid to be used in this invention may be obtained by elimination of D-delta-aminoadipoyl group from cephalosporin C with an acid under mild conditions, an antibiotic being discovered in 1953 among the antibiotics produced by a Cephalosporium sp. which had been isolated from culture fluids in 1945 (Biochemical Journal, 79, 408–416 (1961)), and also by hydrolysis of cephalosporin C with acetic anhydride and nitrosyl chloride in good yield (The Journal of the American Chemical Society, 84, 3400–3401 (1962)).

7-aminocephalosporanic acid is amphoteric and may be used in the free form or as acid addition salts such as with formic acid, or base salts with the alkali metal, ammonia, triethylamine or dicyclohexylamine.

In the case of using 7-aminocephalosporanic acid as a salt in the reaction, there also may be prepared the corresponding salts.

The sydnone compounds to be used in this invention may be prepared from the N-nitroso derivatives of N-substituted α-amino acids according to the method as described in Chemical Review, 84, 129–147 (1964).

The sydnone compounds include sydnone-4-carboxylic, sydnone-3(or 4)-aliphatic and sydnone-3(or 4)-aromatic acids. Sydnone-3(or 4)-aliphatic acids refer to sydnone-3(or 4)-acetic acid,
sydnone-3(or 4)-propionic acid,
sydnone-3(or 4)-butyric acid,
sydnone-3(or 4)-(α-methyl) acetic acid,
sydnone-3(or 4)-(α-phenyl)acetic acid and the like. Sydnone-3(or 4)-aromatic acids refer to sydnone-3(or 4)-phenylacetic acid, sydnone-3(or 4)-phenyl-propionic acid and the like.

More concrete examples of the sydnone acetic acids are sydnone-3-acetic acid,
3(or 4)-methylsydnone-4(or 3)-acetic acid,
3(or 4)-ethylsydnone-4(or 3)-acetic acid,
3(or 4)-propylsydnone-4(or 3)-acetic acid,
3(or 4)-isopropylsydnone-4(or 3)-acetic acid,
3(or 4-butylsydnone-4(or 3)-acetic acid,
3(or 4)-isobutylsydnone-4(or 3)-acetic acid,
3(or 4)-hydroxymethylsydnone-4(or 3)-acetic acid,
3(or 4)-methoxyethylsydnone-4(or 3)-acetic acid,
3(or 4)acetoxyethylsydnone-4-(or 3)-acetic acid,
3(or 4)-phenylsydnone-4(or 3)-acetic acid,
3(or 4)-(m-chlorophenyl) sydnone-4(or 3)-acetic acid,
3(or 4)-(p-hydroxyphenyl)sydnone-4(or 3)-acetic acid,
3(or 4)-(p-methoxyphenyl) sydnone-4(or 3)-acetic acid,
3(or 4)-benzylsydnone-4(or 3)-acetic acid,
3(or 4)-(p-nitrobenzyl)sydnone-4(or 3)-acetic acid,
3(or 4)-(2-phenylethyl)sydnone-4(or 3)-acetic acid and the like.

Other sydnone compounds may bear the same substituent as that of the sydnone acetic acid mentioned above, in the 3- or 4-position where it is not replaced with Z.

The sydnone compounds also may be used as a reactive derivative in the reaction and examples of reactive derivatives are the acid halides, acid amides such as the active amides with imidazoles, acid esters such as the active esters with p-nitrophenol, o-nitrophenol or N-hydroxyphthalimide and acid mixed anhydrides such as the anhydrides with ethyl chlorocarbonate, isopropylchlorocarbonate or isobutylchlorocarbonate, and with pivaloyl, valeroyl or isovaleroyl chloride.

The acylation of 7-aminocephalosporanic acid with the sydnone compounds or reactive derivatives thereof may be carried out in a solvent in the absence or presence of a base and a condensing agent.

Examples of the solvents are acetone, dioxane, chloroform, ethylene chloride, tetrahydrofuran and any other organic solvent inert in the reaction. Hydrophilic ones may be preferably employed with water. Examples of the bases are alkali metal hydrogen carbonate (such as sodium hydrogen carbonate), trialkylamine (such as triethylamine) and pyridine. Examples of the condensing agents are N,N'-diethylcarbodiimide,
N,N'-di-n-propylcarbodiimide,
N,N'-diisopropylcarbodiimide,
N,N'-di-n-butylcarbodiimide,
N,N'-diisobutylcarbodiimide,
N-propyl-N'-allylcarbodiimide,
N,N'-dicyclohexylcarbodiimide,
N-ethyl-N'-(4-ethylmorpholino)carbodiimide,
N-cyclohexyl-N'-morpholinoethyl-carbodiimide,
N,N'-carbonyldi(2-methylindazole),
pentamethyleneketene-N-cyclohexylimine,
diphenylketene-N-cyclohexylimine,
1-ethoxy-1-chloroethylene,
tetraethyl phosphite,
ethyl polyphosphate,
isopropyl polyphosphate,
oxyphosphorus chloride,
phosphorus trichloride,
oxalylchloride,
thionylchloride and N-ethyl-5-phenylisoxazolium-3'-sulfonate.

Preferred solvents are chloroform and tetrahydrofuran, preferred base is triethylamine and preferred condensing agent is N,N'-dicyclohexylcarbodiimide.

The 7-substituted compounds may be converted in the conventional method by treatment with a suitable base to the corresponding salts. The salts are the alkali metal salts such as sodium or potassium salts, ammonium salts and the organic salts such as the salts of diphenylenediamine,
dicyclohexylamine,
N-methyl-N-n-butoxyethylbenzylamine,
N,N-di-n-butoxyethylbenzylamine,
tri-n-butoxyethylamine,
di-n-butoxyethylamine,
N-methyl-N-n-butoxyethylamine,
N-methylpiperazine,
N-methyl-4-chloropiperidine,
N-methylmorpholine,
N,N'-dibenzylethylenediamine,
N,N-diethyl-p-aminobenzyloxymethyl amine,
guanyl urea,
N,N-dibenzyl-$\beta$-aminoethanol,
tri-n-butyl amine,
dibenzyl amine,
triethyl-amine and the like.

All the compounds in this invention are novel and useful as a potent antibacterial agent against both Gram-positive and Gram-positive organisms.

The following examples are given to illustrate but not to limit the invention.

EXAMPLE I

A tetrahydrofuran solution (4 ml.) containing 650 mg. of dicyclohexylcarbodiimide was added to 10 ml. of a tetrahydrofuran solution containing 570 mg. of 3-isopropylsydnone-4-carboxylic acid. The resultant solution was stirred for 20 minutes and then a solution of 820 mg. of 7-aminocephalosporanic acid in 4 ml. of triethylamine and 25 ml. of chloroform was added in cool. The resultant solution was stirred for an hour in cool and for 4 hours at room temperature, and concentrated under reduced pressure. Then 30 ml. of an aqueous solution containing 800 mg. of sodium hydrogen carbonate was added. The solution was filtered, concentrated under reduced pressure and extracted with 35 ml. of an acetone aqueous solution (6:1). The extract was concentrated under reduced pressure and the concentrate was treated with 20 ml. of benzene and 20 ml. of ether to obtain a powder (430 mg.) of 7-(3-isopropylsydnone-4-carbonamido)cephalosporanic acid melting at 215° C. (decomposed).

UV (tetrahydrofuran)

$\lambda_{inf.}$ 260 m$\mu$ $E_{1cm}^{1\%}$ 165
$\lambda_{inf.}$ 305 m$\mu$ $E_{1cm}^{1\%}$ 151

EXAMPLE II

A tetrahydrofuran solution (6 ml.) containing 70 mg. of dicyclohexylcarbodiimide was added to a solution of 620 mg. of 3-phenylsydnone-4-carboxylic acid in 10 ml. of acetone and 10 ml. of tetrahydrofuran. The solution was stirred for 40 minutes and then added with 50 ml. of a chloroform solution containing 820 mg. of 7-aminocephalosporanic acid and 300 mg. of triethylamine. The resultant solution was stirred for 2 hours at 5–10° C., for 3 hours at room temperature and allowed to stand overnight. The reaction mixture was concentrated under reduced pressure and the concentrate was diluted with water, adjusted to pH 7.4 with sodium hydrogen carbonate, filtered, acidified with sulfuric acid and extracted four times with 40 ml. of ethyl acetate. The extract was dried over sodium sulfate and concentrated. The residue was dissolved in 10 ml. of acetone and treated with 60 ml. of ether to obtain 142 mg. of 7-(3-phenylsydnone-4-carbonamido)cephalosporanic acid melting at 230° C. (decomposed).

UV (95% ethanol)

$\lambda_{inf.}$ 234 m$\mu$ $E^{1\%}_{1cm.}$ 145

$\lambda_{max.}$ 265 m$\mu$ $E^{1\%}_{1cm.}$ 110

$\lambda_{max.}$ 314 m$\mu$ $E^{1\%}_{1cm.}$ 83

EXAMPLE III

A tetrahydrofuran solution (2 ml.) containing 412 mg. of dicyclohexylcarbodiimide was added to 30 ml. of a tetrahydrofuran solution containing 288 mg. of syndnone-3-acetic acid and then stirred for 25 minutes at room temperature. The resultant solution was added with 30 ml. of a chloroform solution containing 544 mg. of 7-amino-cephalosporanic acid and 202 mg. of triethylamine, stirred for 4 hours at room temperature and allowed to stand overnight. The reaction mixture was filtered and concentrated under reduced pressure.

The residue was dissolved in 10% sodium hydrogen carbonate aqueous solution. The resultant solution was filtered, adjusted to pH 3.0 with hydrochloric acid and extracted with ethyl acetate. The extract was washed with water, dried over magnesium sulfate and concentrated under reduced pressure. The residue was then treated with petroleum ether to obtain a powder (80 mg.) of 7-syd-none-3-acetamido)cephalosporanic acid melting at 145–148° C. (decomposed).

UV (95% ethanol)

$\lambda_{max.}$ 277 m$\mu$ $E^{1\%}_{1cm.}$ 242

MIC (mcg./ml.) E. coli 10, Staph. aureus 1.

EXAMPLE IV

A solution of 1.36 g. of 7-aminocephalosporanic acid and 1 ml. of triethylamine in 20 ml. of chloroform was added to a solution of 1.44 g. of sydnone-3-acetic acid and 1.5 g. of dicyclohexylcarbodiimide in 20 ml. of anhydrous acetone. The resultant solution was stirred for 2.5 hours at room temperature, filtered and concentrated. The residue was dissolved in a sodium hydrogen carbonate aqueous solution, and the solution was filtered, acidified with hydrochloric acid and extracted with ethyl acetate. The extract was washed with water, dried and concentrated. The residue was dissolved in acetone and allowed to stand. The resultant solid formed was treated with 95% ethanol to obtain 1.2 g. of 7-(sydnone-3-acetamido)cephalosporanic acid.

EXAMPLE V

To a solution consisting of 2.8 g. of sydnone-3-acetic acid in 20 ml. of tetrahydrofuran, 20 ml. of tetrahydrofuran and 20 ml. of dichloromethane was added 3.0 g. of dicyclohexylcarbodiimide. The resultant solution was stirred for 30 minutes and then a solution consisting of 2.7 g. of 7-aminocephalosporanic acid, 30 ml. of triethylamine and 30 ml. of chloroform was added in cool. The resultant solution was stirred for 6 hours, allowed to stand overnight, filtered and extracted three times with water, then with a sodium hydrogen carbonate aqueous solution. The extract was washed with ethyl acetate, acidified with hydrochloric acid and extracted with ethyl acetate. The extract was washed with water, dried and concentrated to obtain a powder (1.05 g.) of 7-(sydnone-3-acetamido)cephalosporanic acid.

EXAMPLE VI

A solution of 1.5 g. of dicyclohexylcarbodiimide in 10 ml. of tetrahydrofuran was added to a cooled solution of 1.4 g. of sydnone-3-acetic acid in 15 ml. of tetrahydrofuran. Then the resultant solution was reacted with 0.9 g. of 7-aminocephalosporanic acid dicyclohexylamine salt for an hour at 0° C. and for an hour at room temperature. The precipitate was suspended in water and treated with triethylamine.

The solution was filtered, adjusted to pH 2.0 with hydrochloric acid and extracted with ethyl acetate. The extract was dried and concentrated to obtain 0.5 g. of 7-(sydnone-3-acetamido)cephalosporanic acid.

EXAMPLE VII

A cooled chloroform solution of sydnone-3-acetyl chloride was added to a solution of 1.1 g. of 7-amino-cephalosporanic acid and 0.56 ml. of triethylamine in 40 ml. of chloroform and the resultant solution was stirred for 30 minutes. The reaction mixture was adjusted to pH 7.0, stirred for 3 hours at room temperature, filtered, adjusted to pH 2.0 with hydrochloric acid, extracted with ethyl acetate and concentrated to obtain 60 mg. of 7-(sydnone-3-acetamido)cephalosporanic acid.

EXAMPLE VIII

To a solution of 1.2 g. of sydnone-3-acetic acid and 1.1 g. of triethylamine in 40 ml. of tetrahydrofuran, 1.3 g. of isobutyl chlorocarbonate was added at —25° C. Then 40 ml. of a chloroform solution of 2.7 g. of 7-aminocephalosporanic acid and 1.1 g. of triethylamine was poured at —15° C. The resultant solution was stirred for 30 minutes at —25° C., for an hour at 0° C. and then for 3 hours at room temperature.

The reaction mixture was concentrated and the residue was diluted with water. The solution was alkalized with 10% sodium hydrogen carbonate solution, washed with ethyl acetate, acidified with 10% hydrochloric acid and extracted with ethyl acetate. The extract was washed with water, dried over sodium sulfate and concentrated to leave a residue which was treated with ether to obtain a powder (0.97 g.) of 7-(sydnone-3-acetamido)cephalosporanic acid.

EXAMPLE IX

Into a solution of 1.44 g. of sydnone-3-acetic acid and 1.01 g. of triethylamine in 50 ml. of tetrahydrofuran, 1.53 g. of phosphorus oxychloride was poured at —10° C. The addition required 5 minutes. The solution was stirred for 10 minutes at —10° C. and cooled to —20° C. An anhydrous chloroform solution of 2.72 g. of 7-aminocephalosporanic acid and 2.02 g. of triethylamine was added at —20° C. The resultant solution was stirred for 3 hours at 10 minutes at —10° C. and cooled to —20° C. An an- —10 to —20° C. and then for 2 hours at room temperature. The reaction mixture was filtered, concentrated, diluted with 100 ml. of 10% sodium hydrogen carbonate solution and treated with ether. The water layer was adjusted to pH 3.0 with concentrated hydrochloric acid and extracted with ethyl acetate. The extract was washed with water, and dried and concentrated to leave an oil which was treated with ether to obtain 7-(sydnone-3-acetamido)cephalosporanic acid.

The residue which was obtained by filtrating the reaction mixture was treated as described above to obtain the object compound.

EXAMPLE X

A solution of 460 mg. of 3-benzylsydnone-4-acetic acid in 20 ml. of tetrahydrofuran was added in cool with 30 mg. of dicyclohexylcarbodiimide and then with a solution of 270 mg. of 7-aminocephalosporanic acid and 300 mg. of triethylamine in 10 ml. of chloroform.

The resultant solution was then stirred for 7 hours and allowed to stand for 35 hours in cool. The reaction mixture was filtered and concentrated to leave a residue which was dissolved in water, washed with ethyl acetate, acidified with hydrochloric acid and then extracted with ethyl acetate. The extract was washed with a sodium chloride saturated aqueous solution, dried over sodium sulfate and concentrated to obtain 350 mg. of 7-(3-benzylsydnone-4-acetamido)cephalosporanic acid melting at 105–112° C. (decomposed).

UV (95% ethanol)

$\lambda_{max.}$ 297 m$\mu$ $E^{1\%}_{1cm.}$ 190

EXAMPLE XI

In a similar manner described in Example X, the related compounds may be prepared, starting from 7-aminocephalosporanic acid and substituted sydnone aliphatic acids:

(a) 7-(3-m-chlorobenzylsydnone-4-acetamido)cephalosporanic acid:

M.P. 97–102° C. (decomposed)
UV (2% dimethylformamide)

$\lambda_{max.}$ 268 m$\mu$ $E_{1cm.}^{1\%}$ 154

MIC (mcg./ml.), E. coli >40, Staph. aureus 1.

(b) 7-(4-phenylsydnone-3-acetamido)cephalosporanic acid:

M.P. 158–164° C. (decomposed)
UV (95% ethanol)

$\lambda_{max.}$ 264 m$\mu$ $E_{1cm.}^{1\%}$ 238

$\lambda_{max.}$ 256 m$\mu$ $E_{1cm.}^{1\%}$ 221

$\lambda_{max.}$ 319 m$\mu$ $E_{1cm.}^{1\%}$ 173

MIC (mcg./ml.) E. coli 20, Staph. aureus 0.25.

(c) 7-(sydnone - 3 - propionamido)cephalosporanic acid:

M.P. 145–149° C.
UV (95% ethanol)

$\lambda_{max.}$ 276 m$\mu$ $E_{1cm.}^{1\%}$ 140

MIC (mcg./ml.) E. coli 40, Staph. aureus 2.5.

(d) 7-(3-isobutylsydnone - 4 - acetamido)cephalosporanic acid:

M.P. 112–115° C. (decomposed)
UV (95% ethanol)

$\lambda_{max.}$ 280 m$\mu$ $E_{1cm.}^{1\%}$ 208

MIC (mcg./ml.) E. coli >40, Staph. aureus 1.

(e) 7-(4-methylsydnone - 3 - acetamido)cephalosporanic acid:

M.P. 122–125° C. (decomposed)
UV (95% ethanol)

$\lambda_{max.}$ 276 m$\mu$ $E_{1cm.}^{1\%}$ 177

MIC (Mcg./ml.) E. coli 20, Staph, aureus 2.

(f) 7-(3-phenylethylsydnone-4-acetamido)cephalosporanic acid:

M.P. 144–148° C. (decomposed)
UV (95% ethanol)

$\lambda_{max.}$ 297 m$\mu$ $E_{1cm.}^{1\%}$ 202

MIC (mcg./ml.) E. coli >40, Staph. aureus 1.

(g) 7 - (3-p-methoxybenzylsydnone - 4 - acetamido)cephalosporanic acid.

M.P. 114–118° C. (decomposed)
UV (95% ethanol)

$\lambda_{max.}$ 226 m$\mu$ $E_{1cm.}^{1\%}$ 333.6

$\lambda_{max.}$ 275.5 m$\mu$ $E_{1cm.}^{1\%}$ 226.8

$\lambda_{max.}$ 281.5 m$\mu$ $E_{1cm.}^{1\%}$ 226.8

$\lambda_{inf.}$ 297–298 m$\mu$ $E_{1cm.}^{1\%}$ 200.9

MIC (mcg./ml.) E. coli >40, Staph. aureus 2.

(h) 7-(3-methylsydnone - 4 - acetamido)cephalosporanic acid:

M.P. 124–129° C. (decomposed)
UV (95% ethanol)

$\lambda_{max.}$ 275 m$\mu$ $E_{1cm.}^{1\%}$ 202.3

MIC (mcg./ml.) E. coli 40, Staph, aureus 5.

(i) 7 - (p-(3 - sydnone)phenylacetamido)cephalosporanic acid:

M.P. 194–198° C. (decomposed)
UV (phosphate buffer (pH 6.4))

$\lambda_{max.}$ 262 m$\mu$ $E_{1cm.}^{1\%}$ 340

$\lambda_{inf.}$ 30 m$\mu$ $E_{1cm.}^{1\%}$ 123

MIC (mcg./ml.) E. coli 20, Staph. aureus 0.2.

EXAMPLE XII

A solution of 223 mg. of 4-bromo-3-sydnonacetic acid and 121 mg. of triethylamine in 10 ml. of tetrahydrofuran was reacted with 120 mg. of pivaloyl chloride for 30 minutes at −25° C. Then a solution of 272 mg. of 7-aminocephalosporanic acid and 121 mg. of triethylamine in chloroform was poured into the reaction mixture at below −10° C. The resultant solution was stirred for 30 minutes at below −10° C., for an hour at 0–5° C. and for 3 hours at room temperature. The reaction mixture was filtered and concentrated in vacuo. The resultant oil was treated with 10% sodium hydrogen carbonate and then ether, and adjusted to pH 1.0–2.0 with 10% hydrochloric acid. The aqueous solution was treated with ethyl acetate. The ethyl acetate layer was washed with a sodium chloride aqueous solution, dried over sodium sulfate and concentrated in vacuo to leave an oil which was treated with ether to obtain a powder (6 mg.) of 7-(4-bromo-3-sydnonacetamido)cephalosporanic acid melting at 163–172° C. (decomposed).

UV (2% dimethylformamide)

$\lambda_{max.}$ 252 m$\mu$ $E_{1cm.}^{1\%}$ 184

$\lambda_{max.}$ 306 m$\mu$ $E_{1cm.}^{1\%}$ 150

MIC (mcg./ml.) E. coli 40, Staph. aureus 10.

EXAMPLE XIII

In a similar manner described in Example XII, the related compounds may be prepared, starting from 7-amino cephalosporanic acid and the appropriate substituted sydnone compounds:

(a) 7 - ($\alpha$-methyl-3-sydnonacetamido)cephalosporanic acid:

UV (2% dimethylformamide)

$\lambda_{max.}$ 275 m$\mu$ $E_{1cm.}^{1\%}$ 229

MIC (mcg./ml.) E. coli 40, Staph. aureus 2.

(b) 7 - ($\alpha$-phenyl-3-sydnonacetamido)cephalosporanic acid:

M.P. 102–107° C. (decomposed)
UV (tetrahydrofuran)

$\lambda_{max.}$ 270 m$\mu$ $E_{1cm.}^{1\%}$ 159

$\lambda_{max.}$ 306 m$\mu$ $E_{1cm.}^{1\%}$ 108

MIC (mcg./ml.) E. coli 20, Staph. aureus 2.

EXAMPLE XIV

An acetone solution of 4.0 g. of 7-(syndone-3-acetamido)cephalosporanic acid was reacted with an acetone solution of sodium $\alpha$-ethylhexanoate to obtain sodium 7-(sydnone - 3 - acetamido)cephalosporanate melting at 183.5° C. (decomposed).

UV (phosphate buffer (pH 6.4))

$\lambda_{max.}$ 271 m$\mu$ $E_{1cm.}^{1\%}$ 245

MIC (mcg./ml.) E. coli 10, Staph. aureus 1.

EXAMPLE XV

An acetone solution of 4.0 g. of 7-(sydnone-3-acetamido)cephalosporanic acid and 1.0 g. of potassium hydrogen carbonate was treated with 24 ml. of 95% ethanol to obtain 3.35 g. of potassium 7-(sydnone-3-acetamido) cephalosporanate.

UV (water)

$\lambda_{max.}$ 270 m$\mu$ $E_{1cm.}^{1\%}$ 247

EXAMPLE XVI

A solution of 7-(3-isopropyl-4-acetamido)cephalosporanic acid in 5 ml. of acetone was reacted with 103 mg. of dicyclohexylamine to obtain 170 mg. of 7-(3-isopropylsydnone-4-acetamido)cephalosporanic acid dicyclohexylamine salt melting at 172–174° C. (decomposed).

UV (95% ethanol)

$\lambda_{max}$. 265 m$\mu$ $E_{1cm}^{1\%}$. 154

$\lambda_{max}$. 298 m$\mu$ $E_{1cm}^{1\%}$. 111

MIC (mcg./ml.) E. coli 40, Staph. aureus 2.5.

EXAMPLE XVII

A mixture of 500 mg. of 7-(sydnone-3-acetamido)cephalosporanic acid and 380 mg. of N-methyl-N-n-butoxyethyl benzyl amine in 20 ml. of chloroform was stirred at room temperature and concentrated in vacuo to leave an oil which was treated with ether to obtain a powder (673 mg.) of 7-(sydnone-3-acetamido)cephalosporanic acid N-methyl-N-n-butoxyethyl benzylamine salt melting at 105–110° C. (decomposed).

UV (95% ethanol).

$\lambda_{max}$. 270 m$\mu$ $E_{1cm}^{1\%}$. 186

MIC (mcg./ml.) E. coli 40, Staph. aureus 2.

EXAMPLE XVIII

In a similar manner described under Example XVII, the related compounds were prepared, starting from the appropriate amines and the sydnone derivatives:

(a) 7-(sydnone-3-acetamido)cephalosporanic acid N,N-di-n-butoxyethyl benzylamine salt:

M.P. 108–113° C. (decomposed)
UV (95% ethanol)

$\lambda_{max}$. 275 m$\mu$ $E_{1cm}^{1\%}$. 168

MIC (mcg./ml.) E. coli 5, Staph. aureus 1.

(b) 7-(sydnone-3-acetamido)cephalosporanic acid tri-n-butoxyethylamine salt:

M.P. 110–118° C. (decomposed)
UV (95% ethanol)

$\lambda_{max}$. 274 m$\mu$ $E_{1cm}^{1\%}$. 147

MIC (mcg./ml.) E. coli 40, Staph. aureus 2.

(c) 7-(sydnone-3-acetamido)cephalosporanic acid di-n-butoxyethylamine salt:

M.P. 122–125° C. (decomposed)
UV (water)

$\lambda_{max}$. 272 m$\mu$ $E_{1cm}^{1\%}$. 186

MIC (mcg./ml.) E. coli 10, Staph. aureus 1.

(d) 7-(sydnone-3-acetamido)cephalosporanic acid N-methyl-N-n-butoxyethylamine salt:

M.P. 112–118° C. (decomposed)
UV (water)

$\lambda_{max}$. 272 m$\mu$ $E_{1cm}^{1\%}$. 222

MIC (mcg./ml.) E. coli 20, Staph. aureus 1.

(e) 7-(sydnone-3-acetamido)cephalosporanic acid N,N'-dibenzylethylenediamine salt:

M.P. 198° C. (decomposed)
UV (water)

$\lambda_{max}$. 270 m$\mu$ $E_{1cm}^{1\%}$. 210

MIC (mcg./ml.) E. coli 20, Staph. aureus 1.

(f) 7-(sydnone-3-acetamido)cephalosporanic acid N-p-amino benzoyloxymethyl-N,N-diethylamine salt:

M.P. 65–70° C. (decomposed)
UV (water)

$\lambda_{max}$. 288–289 m$\mu$ $E_{1cm}^{1\%}$. 342

MIC (mcg./ml.) E. coli 40, Staph. aureus 2.

(g) 7-(sydnone-3-acetamido)cephalosporanic acid tri-n-butylamine salt:

M.P. 85–95° C. (decomposed)
UV (water)

$\lambda_{max}$. 271 m$\mu$ $E_{1cm}^{1\%}$. 173

MIC (mcg./ml.) E. coli 20, Staph. aureus 1.

(h) 7-(sydnone-3-acetamido)cephalosporanic acid N-hydroxyethyl-N,N-dibenzylamine salt:

M.P. 60–65° C. (decomposed)
UV (water)

$\lambda_{max}$. 269 m$\mu$ $E_{1cm}^{1\%}$. 165

MIC (mcg./ml.) E. coli 40, Staph. aureus 1.

(i) 7-(sydnone-3-acetamido)cephalosporanic acid triethylamine salt:

M.P. 185° C. (decomposed)
UV (water)

$\lambda_{max}$. 270 m$\mu$ $E_{1cm}^{1\%}$. 230

MIC (mcg./ml.) E. coli 20, Staph. aureus 1.

(j) 7-(sydnone-3-acetamido)cephalosporanic acid dibenzylamine salt:

M.P. 118–123° C. (decomposed)
UV (water)

$\lambda_{max}$. 269–270 m$\mu$ $E_{1cm}^{1\%}$. 173

MIC (mcg./ml. E. coli 20, Staph. aureus 1.

(k) 7-(sydnone-3-acetamido)cephalosporanic acid guanylurea salt.

M.P. 158–160° C. (decomposed)
UV (water)

$\lambda_{max}$. 270 m$\mu$ $E_{1cm}^{1\%}$. 193

MIC (mcg./ml.) E. coli 40, Staph. aureus 1.

EXAMPLE XIX

A solution was prepared by dissolving 400 mg. of 7-(sydnone-3-acetamido)cephalosporanic acid in 20 ml. of tetrahydrofuran and by adding dropwise with 120 mg. of N-methylpiperazine, and stirred for 30 minutes at room temperature. The residue which formed was washed with anhydrous tetrahydrofuran and treated with 10 ml. of anhydrous ether to obtain 400 mg. of 7-(sydnone-3-acetamido)cephalosporanic acid N-methylpiperazine salt melting at 139–143° C. (decomposed).

UV (water)

$\lambda_{max}$. 271 m$\mu$ $E_{1cm}^{1\%}$. 208

MIC (mcg./ml.) E. coli 10, Staph. aureus 1.

EXAMPLE XX

In a similar manner described in Example XIX, the related compounds may be prepared, starting from the sydnone derivatives and the appropriate amines:

(a) 7-(sydnone-3-acetamido)cephalosporanic acid 1-methyl-4-chloropiperidine salt:

M.P. 163–164° C. (decomposed)
UV (water)

$\lambda_{max}$. 271 m$\mu$ $E_{1cm}^{1\%}$. 208

MIC (mcg./ml.) E. coli 10, Staph. aureus 1.

(b) 7-(sydnone-3-acetamido)cephalosporanic acid N-methylmorpholnie salt:

M.P. 161–162° C. (decomposed)
UV (water)

$\lambda_{max}$. 270 m$\mu$ $E_{1cm}^{1\%}$. 217

MIC (mcg./ml.) E. coli 20, Staph. aureus 1.

We claim:
1. A compound selected from the group of compounds of the formula

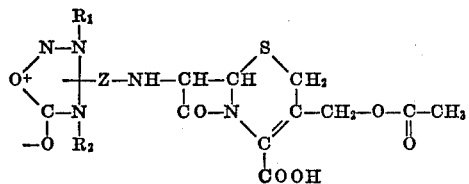

wherein

R₁ is lower alkyl, phenyl, phenyl lower alkyl, chlorobenzyl, or methoxybenzyl;
R₂ is hydrogen, halogen, lower alkyl or phenyl; and
Z is carbonyl or lower alkylene-carbonyl when R₂ is replaced by Z or lower alkylene-carbonyl, phenyl-lower alkylene-carbonyl, or phenylene-lower alkylene-carbonyl when R₁ is replaced by Z; and their pharmaceutically acceptable, non-toxic salts.

2. The compound according to claim 1, wherein said compound is 7-(sydnone - 3 - acetamido)cephalosporanic acid.
3. The compound according to claim 1, wherein said compound is the sodium salt of 7-(sydnone-3-acetamido) cephalosporanic acid.
4. The compound according to claim 1, wherein said compound is 7-(4-phenyl sydnone-3-acetamido)cephalosporanic acid.
5. The compound according to claim 1, wherein said compound is 7-(4-methyl sydnone-3-acetamido)cephalosporanic acid.
6. The compound according to claim 1, wherein said compound is 7-(α-phenyl sydnone-3-acetamido)cephalosporanic acid.
7. The compound having the formula

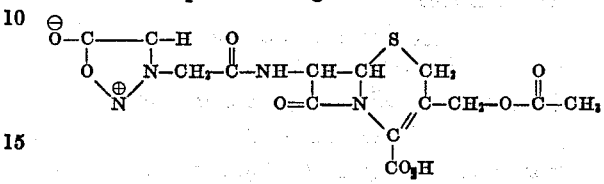

or a non-toxic, pharmaceutically acceptable salt thereof.

References Cited
UNITED STATES PATENTS

| | | | |
|---|---|---|---|
| 3,322,751 | 5/1967 | Crast | 260—243 C |
| 3,530,123 | 9/1970 | Takano et al. | 260—243 C |
| 3,563,983 | 2/1971 | Atarashi et al. | 260—243 C |

NICHOLAS S. RIZZO, Primary Examiner

U.S. Cl. X.R.
424—246